US009336326B2

(12) United States Patent
Abbott et al.

(10) Patent No.: US 9,336,326 B2
(45) Date of Patent: May 10, 2016

(54) BROWSER BASED OBJECTS FOR COPYING AND SENDING OPERATIONS

(75) Inventors: Martin Jeffrey Abbott, Flemington, NJ (US); Ioannis Tsampalis, New Brunswick, NJ (US); Shelley K. Allen, Basking Ridge, NJ (US); Huiyu Wang, Basking Ridge, NJ (US); Kathleen Jane Chylinski, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 967 days.

(21) Appl. No.: 12/648,965

(22) Filed: Dec. 29, 2009

(65) Prior Publication Data

US 2011/0161880 A1    Jun. 30, 2011

(51) Int. Cl.

| | |
|---|---|
| *G06F 3/048* | (2013.01) |
| *G06F 17/30* | (2006.01) |
| *G06F 3/0484* | (2013.01) |
| *G06F 3/0486* | (2013.01) |
| *G06F 3/0488* | (2013.01) |
| *G06F 9/54* | (2006.01) |
| G06F 3/0481 | (2013.01) |
| G06F 3/0482 | (2013.01) |

(52) U.S. Cl.
CPC ........ *G06F 17/30905* (2013.01); *G06F 3/0486* (2013.01); *G06F 3/0488* (2013.01); *G06F 3/04842* (2013.01); *G06F 9/543* (2013.01); G06F 3/0481 (2013.01); G06F 3/0482 (2013.01)

(58) Field of Classification Search
CPC .. G06F 3/0481; G06F 3/04842; G06F 3/0482
USPC .............................. 455/566; 705/78; 715/823
See application file for complete search history.

(56) References Cited

U.S. PATENT DOCUMENTS

| | | | | |
|---|---|---|---|---|
| 6,121,960 A * | 9/2000 | Carroll | ................. | G06F 1/1626 345/169 |
| 6,563,913 B1 * | 5/2003 | Kaghazian | ................. | G06F 3/01 379/88.17 |
| 6,850,260 B1 * | 2/2005 | Taylor | ..................... | G06F 17/21 715/745 |
| 7,707,121 B1 * | 4/2010 | Roever | .................... | G06F 21/10 705/51 |
| 8,234,663 B2 * | 7/2012 | Naick | ..................... | H04L 67/06 715/724 |
| 9,015,620 B1 * | 4/2015 | Delker | ................. | G06F 3/0481 715/810 |

(Continued)

OTHER PUBLICATIONS

Mazzoni, Dominic etc. Audacity, Feb. 29, 2004, version 1.2.0. Shown on pp. 1-6 of the Adobe Acrobat file titled Audacity.pdf.*

(Continued)

*Primary Examiner* — Jeffrey A Gaffin
*Assistant Examiner* — Justin Lee

(57) ABSTRACT

A disclosed method of transferring information between application programs on a mobile device may involve executing a browser application program on the mobile device to display a page containing one or more objects on a touch panel display; responsive to user touching of the display, identifying an object from the displayed page as having been selected by the user; and copying the selected object from the displayed page. The method further includes steps of displaying on the display a list of one or more destination programs available for selection and execution on the mobile device. The method may also involve steps of, responsive to user touching of the touch screen display, identifying one destination program as having been selected by the user, and launching the identified program. Then, the copied object is pasted for use in the execution of the identified destination program.

21 Claims, 7 Drawing Sheets

(56) References Cited

U.S. PATENT DOCUMENTS

| | | | |
|---|---|---|---|
| 2005/0154994 A1* | 7/2005 | Chen | G06F 9/543 715/770 |
| 2005/0165513 A1* | 7/2005 | Obradovich | B60G 17/0195 701/1 |
| 2007/0074133 A1* | 3/2007 | Hara | G06F 3/0481 715/853 |
| 2008/0307358 A1* | 12/2008 | Hintermeister | G06F 3/048 715/821 |
| 2009/0247234 A1* | 10/2009 | Kim | G06F 3/041 455/566 |

OTHER PUBLICATIONS

Anonymous, "OpenService Accelerators Developer Guide," Microsoft Developer Network Library, Mar. 27, 2009, pp. 1-8, XP002652700, URL:http://web.archive.org/web/20090327115834/http://msdn.microsoft.com/en-ur/library/cc287851.aspx.

European Search Report, Aug. 8, 2011.

* cited by examiner

BROWSER BASED OBJECTS FOR COPYING AND SENDING OPERATIONS

TECHNICAL FIELD

The present subject matter relates to techniques and equipment to conveniently allow a user of a mobile device to copy and paste objects from a browser application, particularly character based information such as address, telephone number, e-mail address or v-card information, into another application program.

BACKGROUND

In recent years, a mobile device, such as a cellular phone, has become a popular handheld computer device and many application programs are executable on the mobile device. Accordingly, the user of the mobile device more frequently needs to copy and paste data between different application programs on their mobile devices.

Currently, the users need to invoke several steps to copy and paste specific data between the application programs. For example, to send a phone number from a webpage displayed by a browser to a text messaging composer, the user would have to: (1) Switch from browse mode to select mode; (2) Specify the start location of a text string (e.g., a phone number) to copy; (3) Specify the end location of the text string to copy; (4) Navigate and launch the destination application (e.g., a text message composer); (5) Paste the text string into the destination application; and (6) Re-launch the browser.

However, these methods are complex and time consuming. Further, it may by difficult to specify the start and end locations of the text string on a touch panel display of the mobile device. Hence, a need exists for a method and a device which enables the same copy and paste task with fewer and easier steps, and can more efficiently process information on the mobile device.

SUMMARY

The teachings herein alleviate one or more of the above noted problems with a method of transferring information between application programs on a mobile device, having a plurality of stored application programs at least one of which supports communication of the mobile device through a wireless communication network.

An exemplary method may include steps of executing a browser application program on the mobile device to display a page containing one or more selectable text based objects on a touch screen display of the mobile device, responsive to user touching of the touch screen display, identifying an object from the displayed page as having been selected by the user, and copying the identified user selected object from the displayed page. The method further includes steps of displaying on the touch screen display a list of one or more destination programs available for selection and execution on the mobile device, responsive to user touching of the touch screen display, identifying one destination program as having been selected by the user, and launching the identified destination program for execution on the mobile device. Then, the copied user selected object is pasted for use in the execution of the identified destination program.

Each text based object contained in the displayed page may relate to, for example, a URL, a hyperlink to a specific URL, an address of a physical location, vCard, or a future event. The one or more destination programs may include a message composer program, an address management program, a navigation program, or a scheduler program.

The step of pasting the copied user selected object may involve pasting one or more characters of text of the user selected object for use in the execution of the identified destination program. The step of pasting the copied user selected object may be performed automatically. After the step of pasting, the identified destination program may be automatically closed.

The method may further comprise, before the step of identifying an object, detecting user initiation of a copy/send mode on the mobile device, and in response to the user initiation of the copy/send mode, displaying the one or more objects in a manner that each of the one or more objects are distinguished from other objects or other information displayed on the touch screen display as an object available for selection and copying.

Further, in the method of the present disclosure, the one or more characters of text of the selected object may indicate a selected location, and the execution of the identified destination program may cause the mobile device to generate a map related to the selected location as a display on the touch screen display. The displayed page may comprise a map, and the one or one or more characters of text of the selected object may correspond to location selected by the user from the map. Then, the execution of the identified destination program may cause the mobile device to perform a function in relation to the selected location.

Another disclosed example of a method involves executing a browser application program on the mobile device to display a page containing one or more objects on a touch screen display of the mobile device, responsive to user touching of the touch screen display, identifying an object from the displayed page as having been selected by the user, and obtaining information tied to the identified user selected object including information relating to a location. The method may further include displaying on the touch screen display a list of one or more destination programs available for selection and execution on the mobile device, and launching one of the destination programs for execution on the mobile device. The obtained information may be pasted for use in the execution of the identified destination program.

The information relating to a location may indicate a location of the mobile device or the user of the mobile device. In this type of method, the browser application program may be programmed, when executed, to display a map containing the one or more objects, and the location information contains a location of at least one of the objects on the displayed map.

Any of the above described methods may be realized through a program for mobile device stored on a computer readable medium, such as an optical disk, a hard-disk drive, a magnetic disk, a memory card, a flash memory and so on. Many of these forms of computer readable media may be involved in carrying one or more sequences of one or more instructions and/or associated list data to a processor for execution. Further in yet another embodiment of the present disclosure, the mobile device may contain a processor, a touch panel display and a storage medium, and the storage medium may contain the above mentioned program. Thus, when the program contained in such a medium is executed by the processor of the mobile device, the program may cause the mobile device to execute one of more the methods set forth above.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1A:
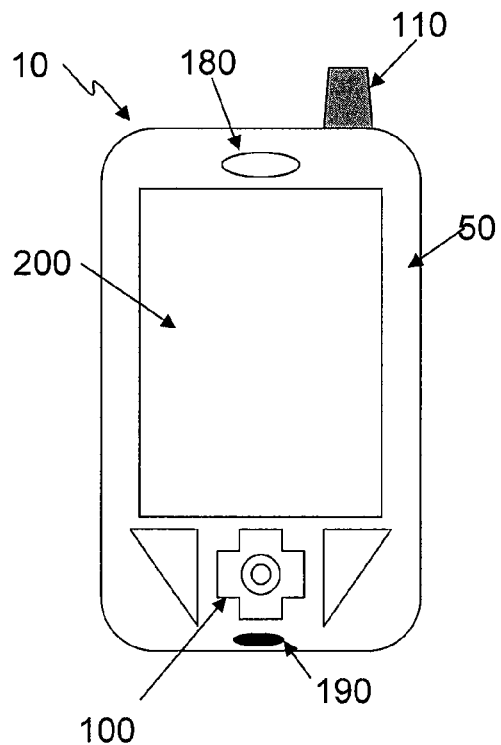
FIG. 1A is an exemplary front view of a mobile device having a touch panel display.

Reference now is made in detail to the examples illustrated in the accompanying drawings and discussed below. FIG. 1A illustrates the front view of an exemplary mobile device.

The mobile device 10, for example, a smart cellular phone, comprises a main body 50, input keys 100, antenna 110, a speaker 180, a microphone 190 and a touch panel display 200. The configuration of these elements is not limited to the arrangement shown in FIG. 1A.

Figure 1B:
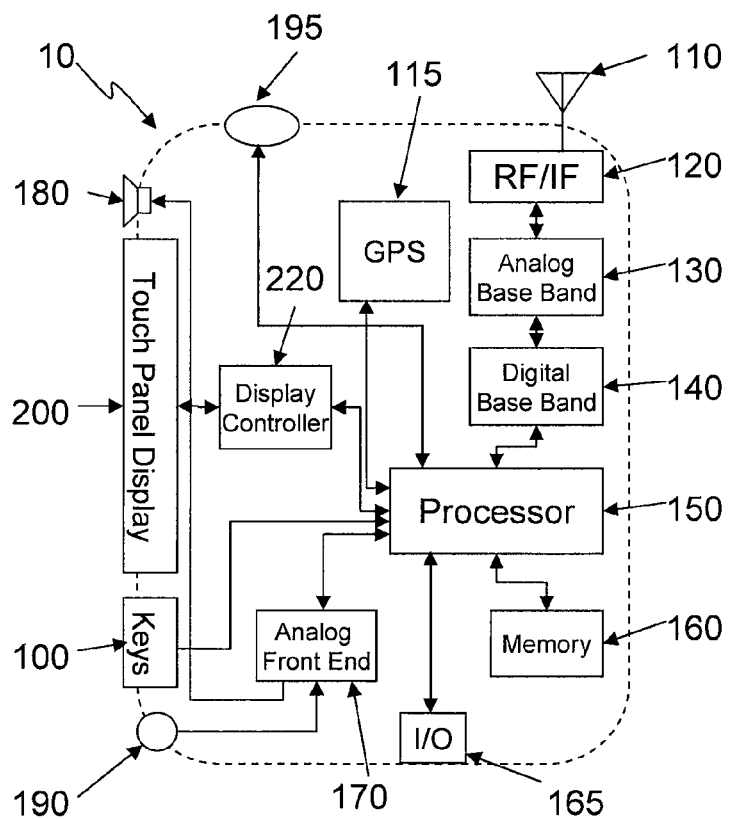
FIG. 1B is an exemplary block diagram of components of a mobile device having a touch panel display.

FIG. 1B shows an exemplary block diagram of elements of the mobile device 10 of FIG. 1A. The mobile device 10, for example, a cellular phone, comprises an RF interface 120 connected to the antenna 110, an analog base band processor 130 and a digital base band processor 140 connected to a processor 150. A display controller or driver 220 is connected to the touch panel display 200 and the processor 150 for controlling the touch panel display 200. An analog front end processor 170 is connected to the processor 150 for controlling the speaker 180 and the microphone 190. The processor 150 in configured to control the display controller 220, RF circuits (120, 130 and 140), the analog front end processor, and an I/O circuit 165. The processor 150 also connects to memory 160. The memory 160, for example, may comprise a RAM, a ROM or a flash memory. The memory 160 may store any number of application programs. The memory 160 also stores a program which realizes a method for copying and sending objects between various application programs available on the mobile device. The mobile device 10 may further include a GPS receiver 115.

Figure 2:
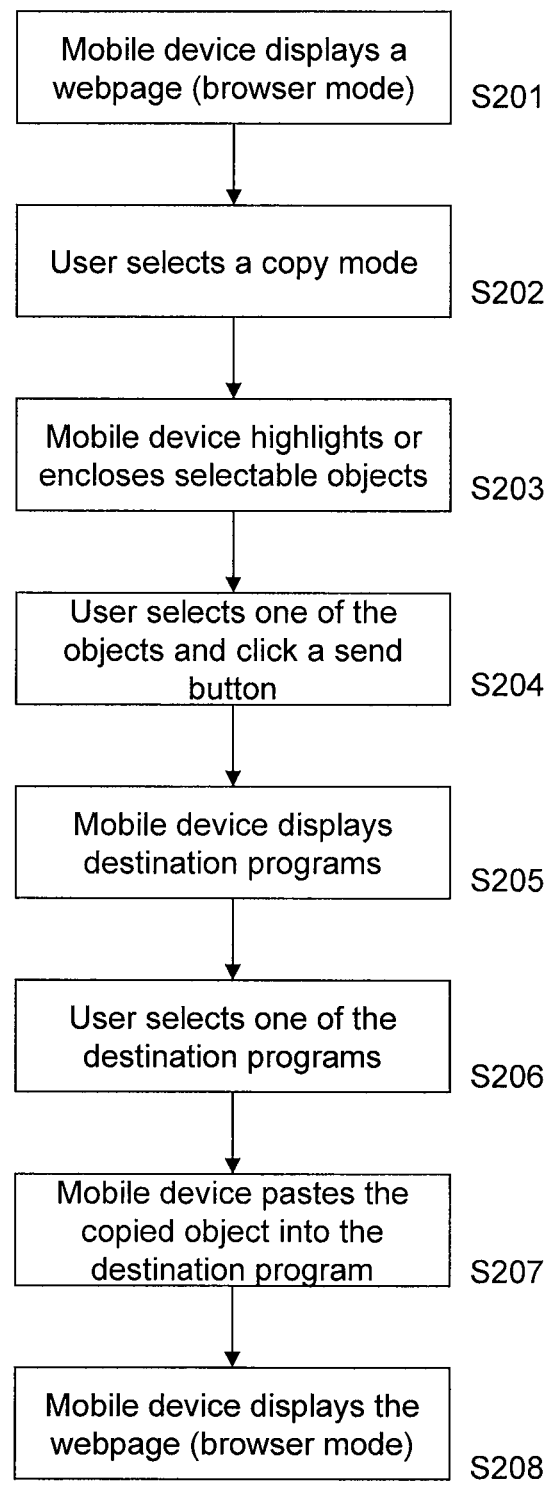
FIG. 2 is a flowchart of one example of a method of transferring information between application programs on a mobile device.
Figure 3:
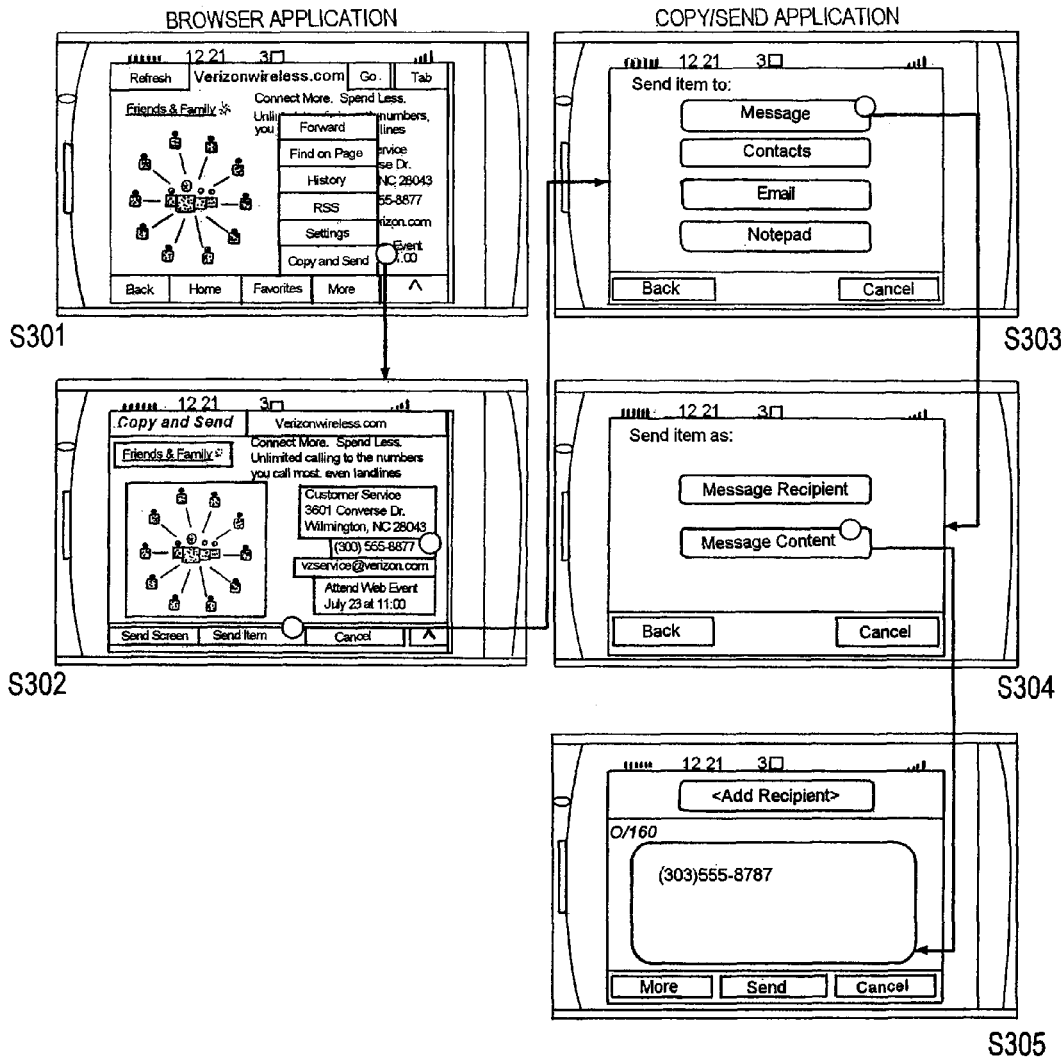
FIG. 3 is an example of display images that the mobile device might display to the user various points during the process of FIG. 2.
Figure 4:
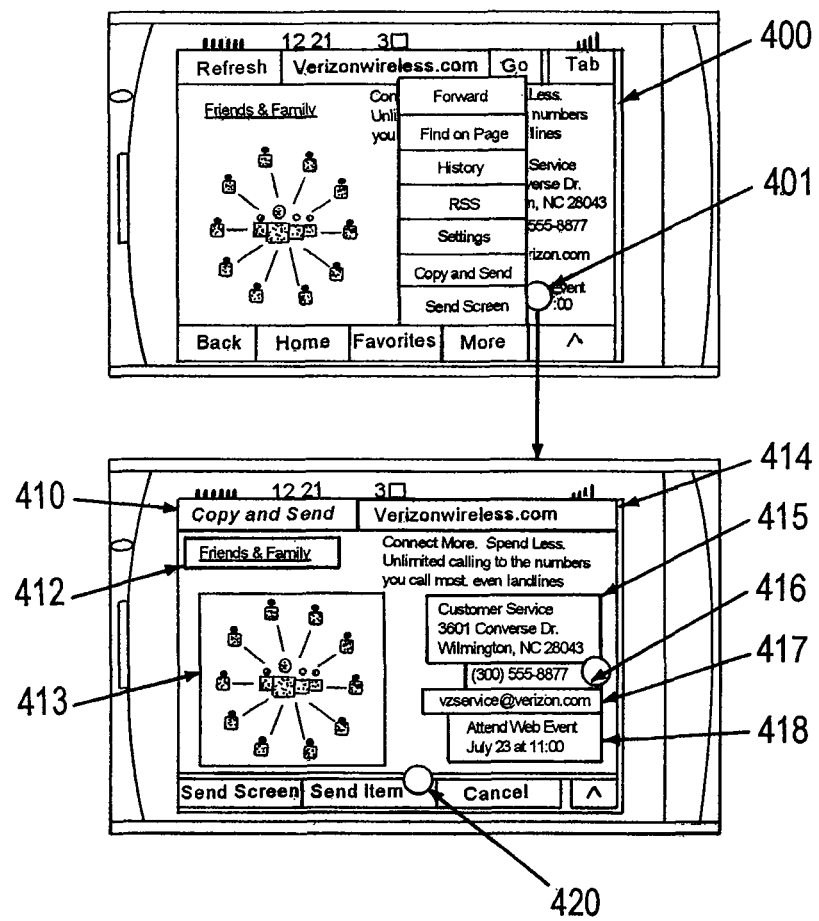
FIG. 4 is an example of a browser mode image and a copy mode image that might be displayed during the process of FIG. 2.

FIGS. 2-4 illustrate one example of the method of transferring information between application programs on a mobile device according to the present disclosure. First, the mobile device displays, as a browser mode 400, a webpage containing one or more objects (S201). The objects may be text based objects relating to, for example, a URL (414), a hyperlink to a specific URL (412), an e-mail address (417), an address of a physical location (415), vCard, a phone number (416), an image content (413) or a future event (418) which may include a time or date information. In the present disclosure, the text based object is a group of characters (texts) which represents specific information such as an address. Further, the object may include or have associated with other related information which is not shown on the display. Examples and details of the objects are described below.

When the user wishes to copy one of the objects and to use it with another application program, the user is able to switch the mobile device from the browser mode to a copy mode by touching or clicking a "copy" mode switch 401 displayed on the touch screen display (S202, S301). Responsive to user touching of the touch screen display, the mobile device changes the touch panel display to the copy mode 410 (S203, S302). In the copy mode, the objects which are selectable by the user are displayed in a manner different from other contents of the webpage. For example, the selectable object may be highlighted or enclosed by a line with a color. Different objects may be highlighted or enclosed with different colors.

The user then selects one of the highlighted selectable objects displayed on the touch screen display in the copy mode (S204). The user may touch or click one of the desired objects. When the user touches or clicks the desired object, the mobile device may further change the display style of the selected object (S302). For example, the mobile device may fill in the enclosed area of the object with color, or display the text in a different format (e.g., bold or italic).

Once the user selects the object, the mobile device copies the object to a clipboard of the mobile device. The clipboard may be an area of the memory of the mobile device. If the object includes related information, the mobile device acquires the related information and pastes it to the clipboard together with the object itself.

Responsive to the user touching or clicking a send button 420, the mobile device then displays a list of destination programs which may include one or more application programs to which the object is copied and used (S205, S303). The application programs may include a text message composer program, an e-mail message composer program, an address management program, a text editor program, a navigation program or a scheduler program. The mobile device may display all of the application programs stored in the mobile device, or may display only the application programs in which the object can be copied and used. For example, if the object is an event object, the list of the destination programs may include the scheduler program, but may not include the address management program. The user may select one of the destination programs from the list by touching or clicking the name of the destination program on the list (S206).

Responsive to user touching or clicking of the touch screen display, the mobile device identifies the destination program as having been selected by the user and launches the identified destination program for execution on the mobile device. The mobile device then pastes the copied object into the destination program (S207). In the destination program, the user may be required to select an area or a destination of the copied object within the destination program. For example, if the user selects a phone number object and a text message composer as a destination program and designates a recipient area as the destination of the copied object, the mobile device launches the text message composer and pastes the phone number to the recipient area of the text message composer.

It is also possible that the destination program pastes the copied object. For example, after the user selects the object and touches or clicks the copy button, the mobile device launches the selected application program. When the application program provides a paste function, the user may use such a paste function to paste the copied object into the application program.

After the mobile device has pasted the object, the mobile device may automatically, or upon detecting the user's instruction, close the destination program and return to the webpage changing the mode from the copy mode to the browser mode (S208).

Figure 5:
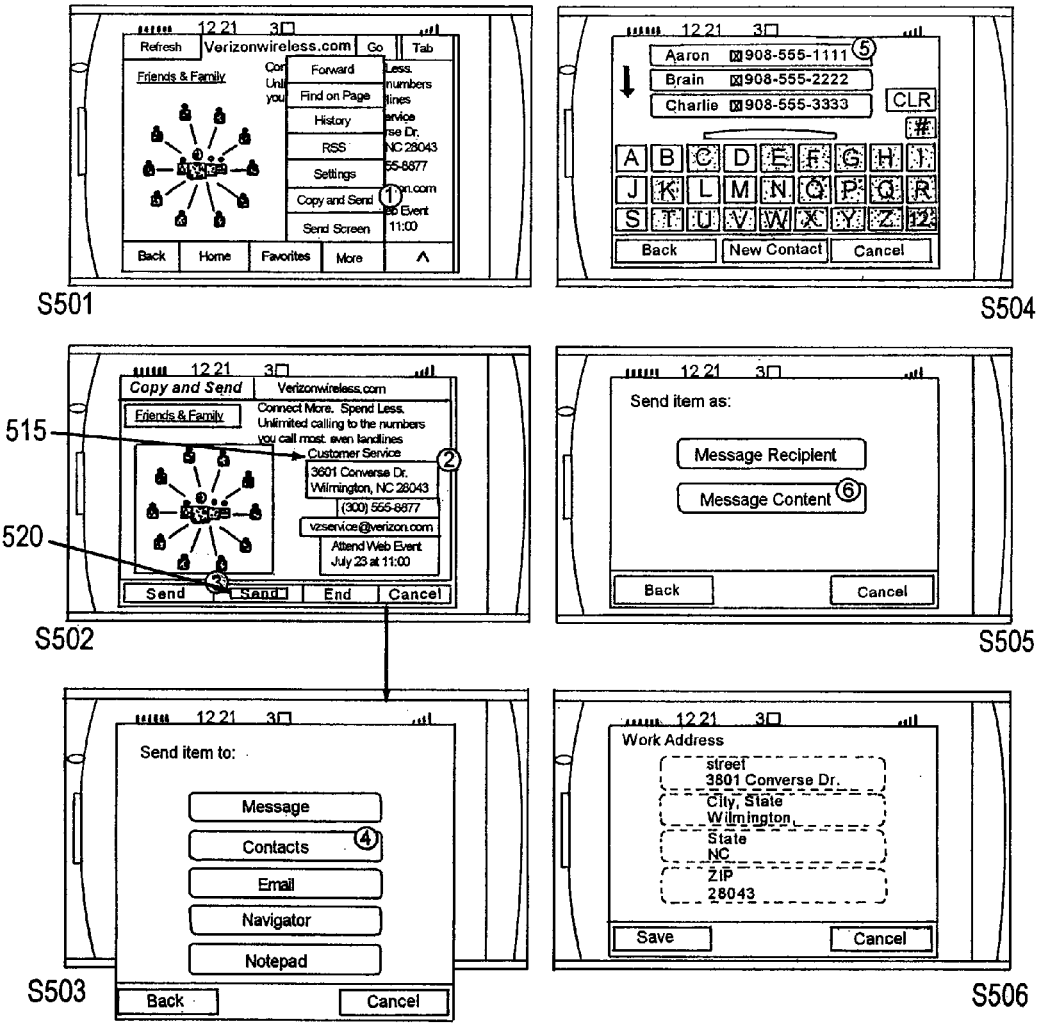
FIG. 5 is another example of display images that might be displayed during the process of FIG. 2.

FIG. 5 illustrates another example of display images that might be displayed during the process of FIG. 2. In this example, an address object 515 is selected and pasted into an existing contact lists.

Similar to FIG. 3, the user switches the mobile device from the browser mode to a copy mode by touching or clicking a "copy" mode switch (S501). The user may select an address object 515, and then touch or click a "send" button 520 (S502). Responsive to the user touching or clicking the send button 520, the mobile device then displays a list of destination programs which may include one or more application programs in which the object is copied and used (S503). In this example, the user selects an existing contact list, i.e., a contact list management program. According to the user's selection, the selected address object 520 is stored in the existing contact list as the person's work address (S504-S506).

In the present disclosure, a variety of selectable "objects" as follows may be utilized.

Hyperlink Object: A hyperlink object is a selectable object that specifies a URL, and may be sent to specific applications (e.g., text messaging composer). When the hyperlink is embedded into a web page, tags are used to specify the type of object. An example of an embedded hyperlink is as follows:
   <a href="http://verizonwireless.com/">Verizon Wireless</a>

Image Object: An image object is a selectable object that specifies an image file (e.g., jpg, png, gif), and may be sent to specific applications (e.g., message composer), stored in a contact list, or stored directly on a mobile device. When this object is embedded into a web page, tags are used to specify the type of object. An example of an embedded image is as follows:
   <img src="vzwireless.gif" alt="VZW Image"/>

URL Page Object: A URL page object is a selectable object that specifies the URL of the page currently on the display. This object may be sent to specific applications (e.g., message composer). Tags are used to specify the type of object. An example of such a tag is as follows:
   <a href="http://verizonwireless.com/">Verizon Wireless</a>

Address Object: An address object is a selectable object that specifies the physical address (location) displayed on a web page. This object may be sent to specific applications (e.g., contact list, message composer, navigator, map application). Tags are used to specify the type of object. An example of such a tag is as follows:

```
<address>
3601 Converse Dr.<br />
Wilmington, NC 28043
</address>
```

Phone Number Object: A phone number object is a selectable object that specifies the phone number displayed on a web page. This object may be sent to specific applications (e.g., message composer, contact list). Tags are used to specify the type of object. An example of such a tag is as follows:

```
<phone>
309-555-XXXX<br />
</phone>
```

Email Address Object: An e-mail address object is a selectable object that specifies the email address displayed on a web page. This object may be sent to specific applications (e.g., email composer, message composer, or contact list). Tags are used to specify the type of object. An example of such a tag is as follows:
   <a href="mailto:vzserivce@verizonwireless.com">Email<a>

Event Object: An event object is a selectable object that specifies a future event including time, date or place information displayed on a web page. This object may be sent to specific applications (e.g., message composer, calendar or scheduler). Tags are used to specify the type of object. An example of such a tag as follows:

```
<p class="vevent">
<abbr class="dtstart" title="2009-08-30T13:00:00+05:00">2</abbr>–
<abbr class="dtend" title="2009-08-30T14:00:00+05:00">4</abbr>pm at
<span class="location">Headquarters</span>
(<a class="url" href="http://vzw">kick-off meeting</a>)
</p>
``` vCard Object: A vCard object is a selectable object that enables a vCard, when selected by the user, to be sent to a receiving application. A vCard is a file format standard for electronic business cards. The vCards are often attached to e-mail. The vCard object may contain name and address information, phone numbers, URLs, logos, photographs or audio clips. This object may be used in a message composer, e-mail composer, a contact list manager, navigator, or a map application. Tags are used to specify the type of object. An example of such a tag is as follows:

```
<div class="vcard">
    <div class="fn org">Customer Service</div>
    <div class="adr">
        <div class="street-address">3601 Converse Dr.</div>
        <div>
            <span class="locality">Wilmington</span>,
            <span class="region">NC</span> <span
            class="postal-code">28043</span>
        </div>
        <div>Phone: <span class="tel">309-555-8877</span></div>
        <div>Email: <span
        class="email">vzservice@verizon.com</span></div>
        <div>
</div>
```

Screen Image Object: A screen image object is a screen capture of a web page that may be sent to other applications (e.g., message composer) or stored directly on the mobile device. The screen image object may be selected through a menu item "Send Screen" as shown in FIG. 4.

It should be noted that the above mentioned objects are examples, and other types of objects may be applicable to the present subject matter.

The above examples of the embodiment of the present subject matter utilize a touch screen on the mobile devices. However, an input device is not limited to the touch panel display. The mobile device may have a directional key application (DPAD) devices. DPAD devices enable to move a cursor on the display left, right, up and downs and may include some soft keys. By using the DPAD device, the user may select a desired object displayed on the display and copy and send the selected object to an application program.

Figure 6:
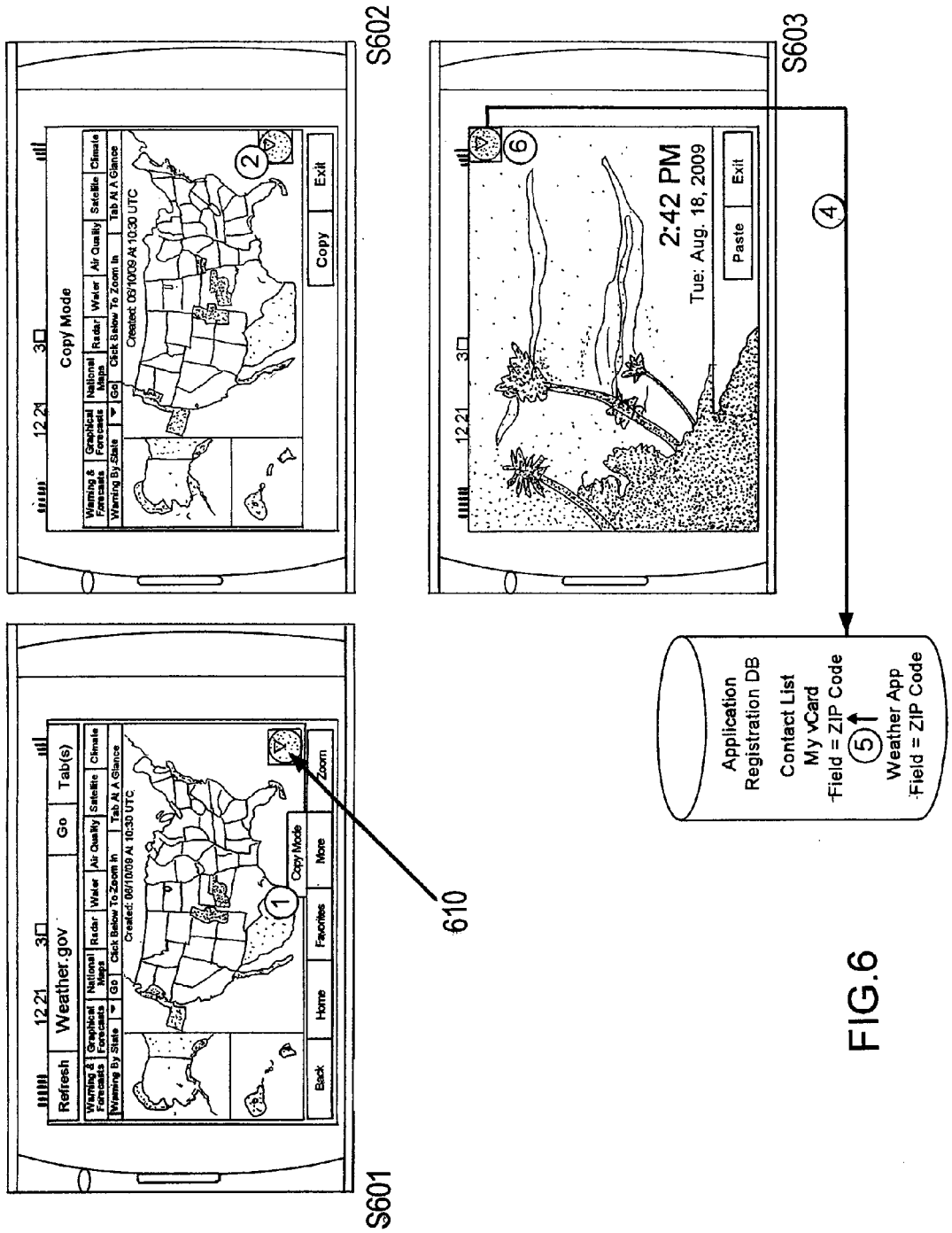
FIG. 6 is another example of display images that might be displayed during a process of transferring information between application programs on a mobile device.

FIG. 6 illustrates yet another example of display images that are displayed during an operation of the mobile device. In this example, the selectable object may be tied to information which contains location information relating to a location. Similar to the above explained example, the mobile device displays one or more objects on the display. In FIG. 6, the mobile device displays a map of the U.S. (S601) including a selectable object 610. The object 610 may include location information, for example, the home address of the user.

Responsive to the user selection of the objects 610 (S602), the mobile device obtains the information tied to the selected object. In this example, the information is weather information specific to the location of the user's home address from a weather report application or a weather report website, and the mobile device displays the weather information on the display (S603).

The location information may be included in or tied to the object 610. In the alternative, upon the selection of the object, the mobile device (or the application program) may obtain the location information from address information stored in or available to the mobile device. For example, the mobile device may obtain the location information from a vCard. If the mobile device has a GPS receiver, the mobile device may obtain the location of the mobile device from the GPS receiver.

Figure 7:
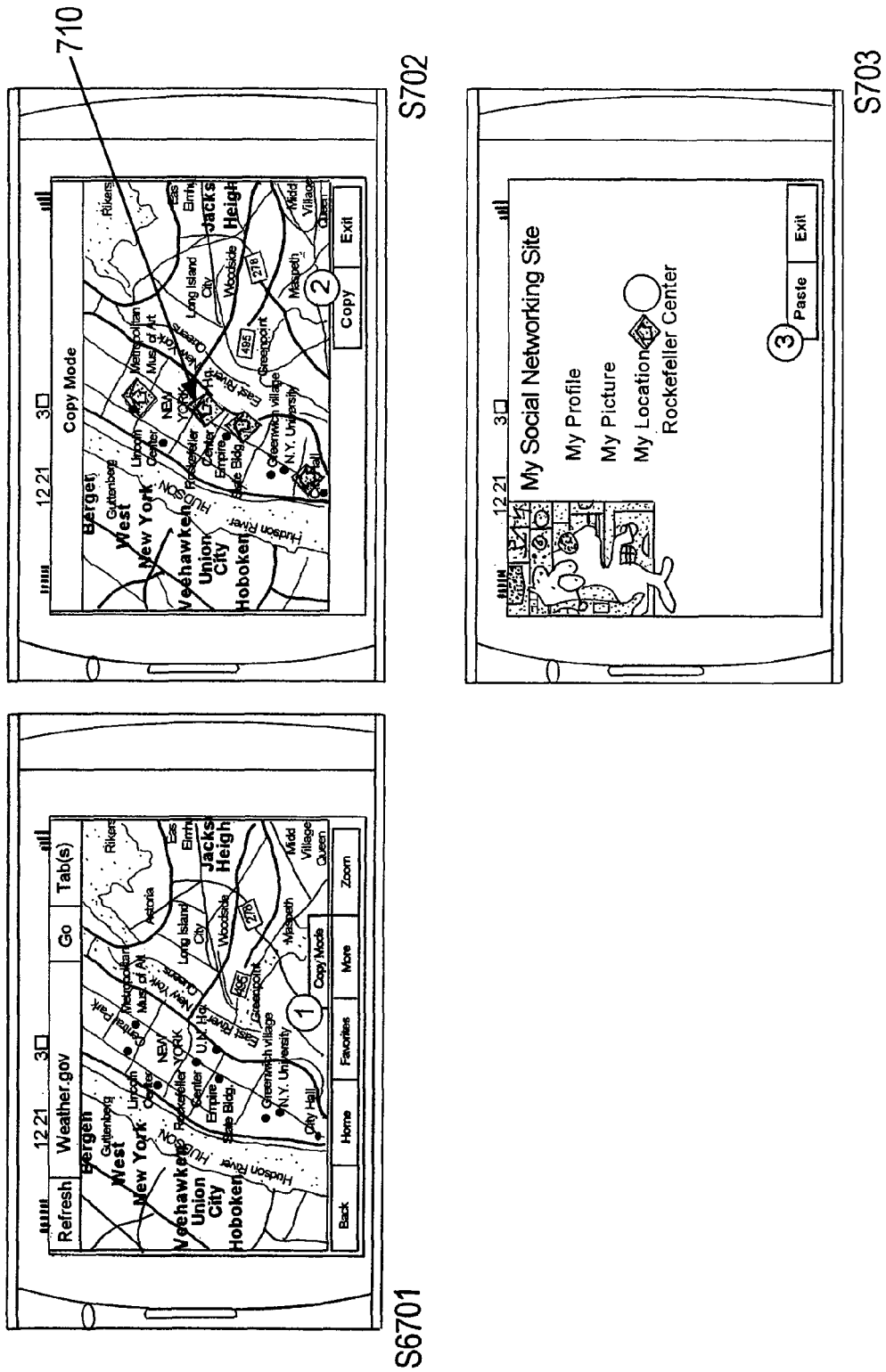
FIG. 7 is another example of display images that might be displayed during a process of transferring information between application programs on a mobile device.

FIG. 7 also illustrates another example of display images that are displayed during an operation of the mobile device utilizing a selectable object tied to information which contains location information relating to a location. Similar to FIG. 6, the mobile device displays a map together with a selectable object 710 (S701 and S702). The object 701 may be a landmark within the displayed map. The object 710 may include the latitude and longitude of the landmark. Alternatively, the mobile device (or the application program) may obtain the location information from data stored in the mobile device. The object 710 may include other information such as a name of the landmark.

Then, the user may copy the object and paste it to the desired application program. In FIG. 7, a social networking site is selected as the application program. When the user pastes the object into the social networking site, a part of or all of the information tied to the object may be pasted to the site and become available on the site (S703).

One of the advantages of the present subject matter is that the user can copy and paste information displayed on the display of the mobile device more easily by simply selecting an "object" displayed on the display. In addition, since the object is sent to the application programs as an object, the receiving application can more efficiently process the information tied to or included in the object.

As shown by the above discussion, functions relating to the transferring information between application programs on a mobile device may be implemented in the form of programming and associated list data for controlling operations of the mobile device. As mentioned earlier, the relevant software (programming and/or list data) may be downloaded and/or updated from a computer platform, for example, from a server or the like communicating with the mobile station via the network. Although special purpose devices may be used to support the download and update functions, such devices also may be implemented using one or more general purpose hardware platforms running appropriate programming. A host or other general purpose data processing device might run "server" programming for the programming and list download functions, whereas the mobile device might run appropriate "client" programming for the complementary functions. At various times, the programming and/or list data resides in memory or other storage media in the server, and once downloaded, resides the memory type storage medium in the mobile device.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:

executing a browser application program on a mobile device to display a page containing a plurality of selectable text based objects and other content on a touch screen display of the mobile device;

responsive to receiving a user selection of a mode from a plurality of available modes displayed on the touch screen display with the plurality of selectable text based objects and the other content of the page, identifying the plurality of selectable text based objects by displaying the identified plurality of selectable text based objects in a manner that each selectable text based object of the plurality of selectable text based objects is distinguished from the other content displayed on the touch screen display that is not selectable in the user selected mode;

in response to receiving the user selection of an identified text based object from the plurality of identified selectable text based objects, automatically copying all of the text contained in the user selected, identified text based object displayed on the displayed page;

in response to selecting an input replacing the display of the plurality of selectable text based objects on the touch screen display with a list of destination programs available for selection and execution on the mobile device, wherein the list of destination programs includes two or more of a text message composer program, an e-mail message program, an address management program, a text editor program, a navigation program or a scheduler program;

responsive to receiving the user selection of one of the listed destination programs displayed on the touch screen display, identifying one destination program as having been selected by the user;

launching the identified destination program for execution on the mobile device; and pasting all of the copied text from the selected identified text based object into a user interface for use in the execution of the identified destination program.

2. The method of claim 1, wherein the step of pasting the copied text is performed automatically.

3. The method of claim 1, wherein the plurality of selectable text based objects relates to a URL, a hyperlink to a specific URL, an address of a physical location, vCard, or a future event.

4. The method of claim 1, wherein the selected mode is a copy/send mode on the mobile device.

5. The method of claim 1, further comprising, after the step of pasting, automatically closing the identified destination program.

6. The method of claim 1, wherein:
the text in the user selected text based object indicates a selected location; and
the execution of the identified destination program causes the mobile device to generate a map related to the selected location as a display on the touch screen display.

7. The method of claim 1, wherein:
the displayed page comprises a map;
the text in the user selected text based object corresponds to a location selected by the user from the map; and
the execution of the identified destination program causes the mobile device to perform a function in relation to the selected location.

8. A method comprising steps of:
executing a browser application program on a mobile device to display a page containing a plurality of selectable text based objects and other content on a touch screen display of the mobile device;
responsive to a user selecting a mode from a plurality of available modes displayed on the touch screen display of the page with the plurality of selectable text based objects and the other content on the touch screen display of the mobile device, altering the display to distinguish each selectable text based object of the plurality of selectable text based objects from the other content on the page, wherein the appearance of the other content that is not selectable in the user selected mode remains unchanged after altering the display of the plurality of selectable text based objects;
responsive to user selection of a selectable text based object from the plurality of selectable text based objects via a user touching of the touch screen display after initiation of the mode change and while distinguishing in the display the one or more selectable text based objects from the other content contained in the displayed page, copying the user selected text based object to a memory;
obtaining information tied to the user selected text based object, wherein the obtained information contains location information relating to a location;
automatically launching a destination program for execution on the mobile device, wherein the destination program is one or more application programs that uses the user selected text based object;
replacing a portion of the displayed page containing the plurality of selectable text based objects with a user interface of the launched destination program;
pasting all or part of the obtained information with the copied, user selected text based object into the user interface for use in the execution of the launched destination program;
closing the destination application; and
returning to the display of the page containing the plurality of selectable text based objects and the other content, wherein the display of the plurality of selectable text based objects is indistinguishable from the display of the other content on the page.

9. The method of claim 8, wherein:
the browser application program is programmed, when executed, to display a map containing the plurality of selectable text based objects, and
the location information contains a location of said at least one of the selectable text based objects on the displayed map.

10. The method of claim 8, wherein:
the location information relates to a location of the mobile device or the user of the mobile device.

11. An article of manufacture comprising a computer readable non-transitory storage medium containing a program which, when executed, causes a mobile device to execute a method, the method comprising steps of:
displaying a page containing a plurality of selectable text based objects and other content on a touch screen display of the mobile device;
responsive to receiving a user selection of a mode from a plurality of available modes displayed on the touch screen display with the plurality of selectable text based objects and the other content of the page, identifying the plurality of selectable text based object within the displayed page by displaying the identified plurality of selectable text based objects in a manner that each selectable text based object of the plurality of selectable text based objects is distinguished from the other content displayed on the touch screen display that is not selectable in the user selected mode;
in response to receiving a selection of at least one of the identified text based objects, automatically copying all of the text contained in the at least one user selected, identified text based object displayed on the displayed page;
in response to selecting an input, replacing the display of the plurality of selectable text based objects on the touch screen display with a list of destination programs available for selection and execution on the mobile device, wherein the list of destination programs includes two or more of a text message composer program, an e-mail message program, an address management program, a text editor program, a navigation program or a scheduler program;
responsive to receiving the user selection of one of the listed destination programs displayed on the touch screen display, identifying one destination program as having been selected by the user;
launching the identified destination program for execution on the mobile device; and
pasting all of the copied text from the selected at least one identified text based objects into a user interface for use in the execution of the identified destination program.

12. A mobile device, comprising:
a processor;
a touch screen display; and
a non-transitory storage medium containing a program, wherein:
the program, when executed by the processor, causes the mobile device to execute functions for transferring information between application programs on the mobile device having a plurality of stored application programs at least one of which supports communication of the mobile device through a wireless communication network, and the functions comprise:
- display in a browser application program a page containing a plurality of selectable text based objects and other content on a touch screen display of the mobile device;
- responsive to receiving a user selection of a mode from a plurality of available modes displayed on the touch screen display with the plurality of selectable text based objects and the other content of the page, identifying the plurality of selectable text based objects by displaying the identified plurality of selectable text based objects in a manner that each selectable text based object of the plurality of selectable text based objects is distinguished from the other content displayed on the touch screen display that is not selectable in the user selected mode;
- in response to receiving the user selection of an identified text based object from the plurality of selectable text based objects, automatically copying all of the text contained in the user selected, identified selectable text based object displayed on the displayed page;
- in response to selecting an input, replacing the display of the plurality of selectable text based objects on the touch screen display with a list of destination programs available for selection and execution on the mobile device, wherein the list of destination programs includes two or more of a text message composer program, an e-mail message program, an address management program, a text editor program, a navigation program or a scheduler program;
- responsive to receiving the user selection of one of the listed destination programs displayed on the touch screen display, identifying one destination program as having been selected by the user;
- launching the identified destination program for execution on the mobile device; and
- pasting all of the copied text from the selected identified, selectable text based object into a user interface for use in the execution of the identified destination program.

13. An article of manufacture comprising a computer readable non-transitory storage medium containing a program which, when executed, causes a mobile device to execute a method, the method comprising steps of:
- executing a browser application program on the mobile device to display a page containing a plurality of selectable text based objects and other content on a touch screen display of the mobile device;
- responsive to a user selecting a mode from a plurality of available modes displayed on the touch screen display of the page with the plurality of selectable text based objects and the other content on the touch screen display of the mobile device, altering the display to distinguish each selectable text based object of the plurality of selectable text based objects from the other content on the page, wherein the appearance of the other content remains unchanged after altering the display that is not selectable in the user selected mode;
- responsive to user selection of a selectable text based object from the plurality of selectable text based objects via a user touching of the touch screen display after initiation of the mode change, while distinguishing in the display the plurality of selectable text based objects from the other content contained in the displayed page, copying the user selected text based object to memory;
- obtaining information tied to the identified user selected text based object, wherein the obtained information contains location information relating to a location;
- automatically launching a destination program for execution on the mobile device, wherein the destination program is one or more application programs that uses the user selected text based object;
- replacing a portion of the displayed page containing the plurality of selectable text based objects with a user interface of the launched destination program;
- pasting all or part of the obtained information with the copied, user selected text based object into the user interface for use in the execution of the launched destination program;
- closing the destination application;
- returning to the display of the page containing the plurality of selectable text based objects and the other content, wherein the display of the plurality of selectable text based objects is indistinguishable from the display of the other content on the page.

14. A mobile device, comprising:
- a processor;
- a touch screen display; and
- a non-transitory storage medium containing a program, wherein:
- the program, when executed by the processor, causes the mobile device to execute functions for transferring information between application programs on the mobile device having a plurality of stored application programs at least one of which supports communication of the mobile device through a wireless communication network, and the functions comprise:
  - executing a browser application program on the mobile device to display a page containing a plurality of selectable text based objects and other content on a touch screen display of the mobile device;
  - responsive to a user selecting a mode from a plurality of available modes displayed on the touch screen display, detecting user initiation of a mode change associated with the selected mode switch on the mobile device;
  - in response to the detected mode change, altering the display of the plurality of selectable text based objects to distinguish each selectable text based object of the plurality of selectable text based objects displayed on the displayed page from the other content that is not selectable in the user selected mode on the displayed page, wherein the appearance of the other content remains unchanged after altering the display of the plurality of selectable text based objects;
  - responsive to user selection of a selectable text based object from the plurality of selectable text based objects via a user touching of the touch screen display after initiation of the mode change and while distinguishing in the display the plurality of selectable text based objects and the other content contained in the displayed page, copying the user selected text based object to the storage medium;
  - obtaining information tied to the identified user selected text based object, wherein the obtained information contains location information relating to a location;
  - automatically launching a destination program for execution on the mobile device, wherein the destination program is one or more application programs that uses the user selected text based object;

replacing a portion of the displayed page containing the plurality of selectable text based objects with a user interface of the launched destination program;

pasting all or part of the obtained information with the copied, user selected text based object for use in the execution of the launched destination program;

closing the destination application; and returning to the display of the page containing the one or more selectable text based objects and the other content, wherein the display of the one or more selectable text based objects is indistinguishable from the display of the other content on the page.

15. The method of claim 8, wherein the step of altering the display of the one or more selectable text based objects comprises:

highlighting the plurality of selectable text based objects to indicate that the plurality of selectable text based objects is available for selection and copying that distinguishes the plurality of selectable text based objects from other objects or the other content displayed on the touch screen display that are not available for selection and copying.

16. The method of claim 15, wherein different objects of the plurality of selectable text based objects are highlighted with different colors as compared to the other objects and the other content.

17. The method of claim 8, wherein the step of altering the display of the plurality of selectable text based objects comprises:

enclosing the plurality of selectable objects by a line to indicate that the plurality of selectable objects is available for selection and copying that distinguishes the plurality of selectable objects from the other objects or the other content displayed on the touch screen display that are not available for selection and copying.

18. The method of claim 17, wherein different objects of the plurality of selectable text based objects are enclosed with different color lines.

19. The method of claim 8, wherein the step of altering the display of the displayed page comprises:

automatically filling in an area of the user selected text based object in the display with color to indicate that the selected text based object has been selected.

20. The method of claim 8, wherein the step of altering the display of the displayed page comprises:

automatically changing text of the user selected text based object to a different format to indicate that the selected text based object has been selected.

21. The method of claim 1, wherein the plurality of available modes includes one or more of:

a forward mode that forwards the user selected, identified text object;

a find on page mode that finds text in the user selected, identified text object elsewhere on the page;

a history mode that provides a history of the user selected, identified text object; and a copy/send mode that copies and sends the user selected, identified text object via the destination program.

\* \* \* \* \*